United States Patent [19]

Anderberg

[11] 4,112,958
[45] Sep. 12, 1978

[54] CANOPY DEVICE

[75] Inventor: Nils-Eric Anderberg, Lund, Sweden

[73] Assignee: Fabriksmontering i Trelleborg AB, Trelleborg, Sweden

[21] Appl. No.: 794,616

[22] Filed: May 6, 1977

[30] Foreign Application Priority Data

May 11, 1976 [SE] Sweden ................ 7605337

[51] Int. Cl.² ........................................ B65G 11/14
[52] U.S. Cl. ................................... 135/5 A; 14/71.5
[58] Field of Search ................... 14/71.5; 135/5 A

[56] References Cited

U.S. PATENT DOCUMENTS

| | | | |
|---|---|---|---|
| 3,479,677 | 11/1969 | Burns | 135/5 A |
| 3,639,934 | 2/1972 | Eggert, Jr | 14/71.5 |
| 3,641,604 | 2/1972 | Eggert, Jr | 14/71.5 |
| 3,644,952 | 2/1972 | Hatch | 135/5 A |
| 3,693,204 | 9/1972 | Eggert, Jr | 14/71.5 |
| 3,711,881 | 1/1973 | Chapman et al. | 14/71.5 |
| 3,816,867 | 6/1974 | Shirzad et al. | 135/5 A |

Primary Examiner—Werner H. Schroeder
Assistant Examiner—Conrad L. Berman
Attorney, Agent, or Firm—Brumbaugh, Graves, Donohue & Raymond

[57] ABSTRACT

A canopy device, especially for aircraft bridges, adapted to cover between two through-openings which are orientable into alignment with one another and located each in one body the first one of which carries the canopy device and includes the first opening which is generally vertical, and the second body is a craft of varying shape, including the second opening. The canopy device has a front portion which is movable into engagement with the craft to provide a weatherproof passage between the openings. Protective pads are pivotally mounted to the side of the canopy facing the craft and the uppermost pad pivots in forward-downward direction due to gravity, whereupon the next pads will follow successively into engagement with the craft.

6 Claims, 4 Drawing Figures

CANOPY DEVICE

The present invention relates to a canopy device intended to be connected between two through-openings which are orientable into alignment with one another and located each in one body the first one of which carries the canopy device and includes the first opening which is generally vertical, and the second body is a craft of varying shape and includes the second opening, said canopy device having a front portion which is movable into engagement with the craft to provide a weatherproof passage between the openings, said canopy device comprising a collapsible and extensible bellows cloth having its rear edge secured to the two sides and the top part of the first opening, a series of generally U-shaped guide and support ribs which are attached to the cloth for guiding and bracing it and are mounted for vertical pivotal movement at their bottom ends, and a retracting and extending means, the ribs disposed most remotely from said first opening being so arranged that the outermost rib is connected throughout its length with the front top edge of the cloth and, at the free ends of its side parts, is attached for vertical pivotal movement, to the respective side part of the next rib at a distance from the free end of this rib, said distance defining the lower portions of said side parts, said next rib and the immediately following ribs being interconnected in the same way.

Canopies of this type are used in aircraft bridges for loading and unloading passengers and/or goods. The main purpose of such canopies is to provide a shelter from rain, snow, wind and cold.

Conventional canopy devices comprise a cloth which is secured to the opening of the aircraft bridge and has ribs which are all of substantially equal length, i.e. they extend along the two side parts and the top part of the cloth. For the retraction and extension of such prior art canopy devices use is made of arms having their one ends secured each to one side of the opening of the aircraft bridge and their opposite ends connected at the top of the side parts of the foremost rib. Canopy devices with such arms entail certain disadvantages. On one hand, when the canopy is being retracted or extended the arms may cause serious damage to as well human beings as airplanes and, on the other hand, the canopy may come quite out of order in case of faults with the arms proper or their operating mechanism.

The object of the invention is to provide a canopy device which, while avoiding the disadvantages of prior art devices, permits efficient tightening relative to the craft, is easy to operate and of extremely simple construction.

This object is achieved by the canopy device of the present invention wherein protective pads are attached to the top and side parts of the outermost rib and to the lower parts of the next following ribs, at the sides of said parts facing the craft, and wherein, when the canopy device is being extended, the outermost rib with associated pads pivots in forward-downward direction due to gravitation, whereupon the next ribs with their pads will follow successively into engagement with the craft.

A preferred embodiment of the device of the present invention will be described in more detail hereinafter with reference to the accompanying drawings, in which.

Figure 1:
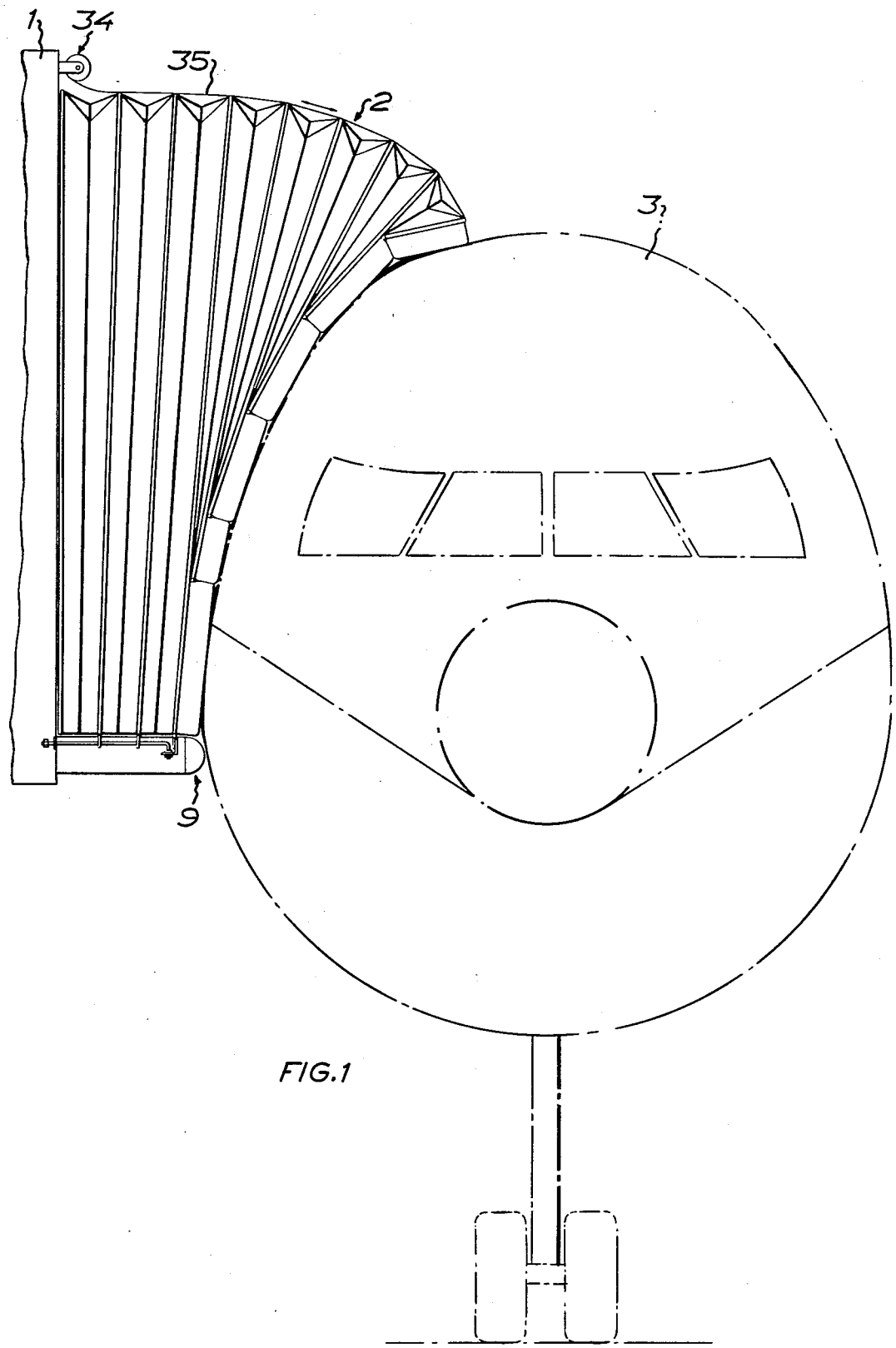
FIG. 1 is a schematical side elevation of the outer end of an aircraft bridge which, through a canopy device according to the invention, is connected to an aircraft indicated by dash-dot lines.

FIG. 1 illustrates an aircraft bridge 1 which, via a canopy device 2 according to this invention, is connected to a fuselage 3. It is seen in FIG. 1 how the canopy device adheres to the configuration of the fuselage in order to provide as complete a tightening as possible.

Figure 2:
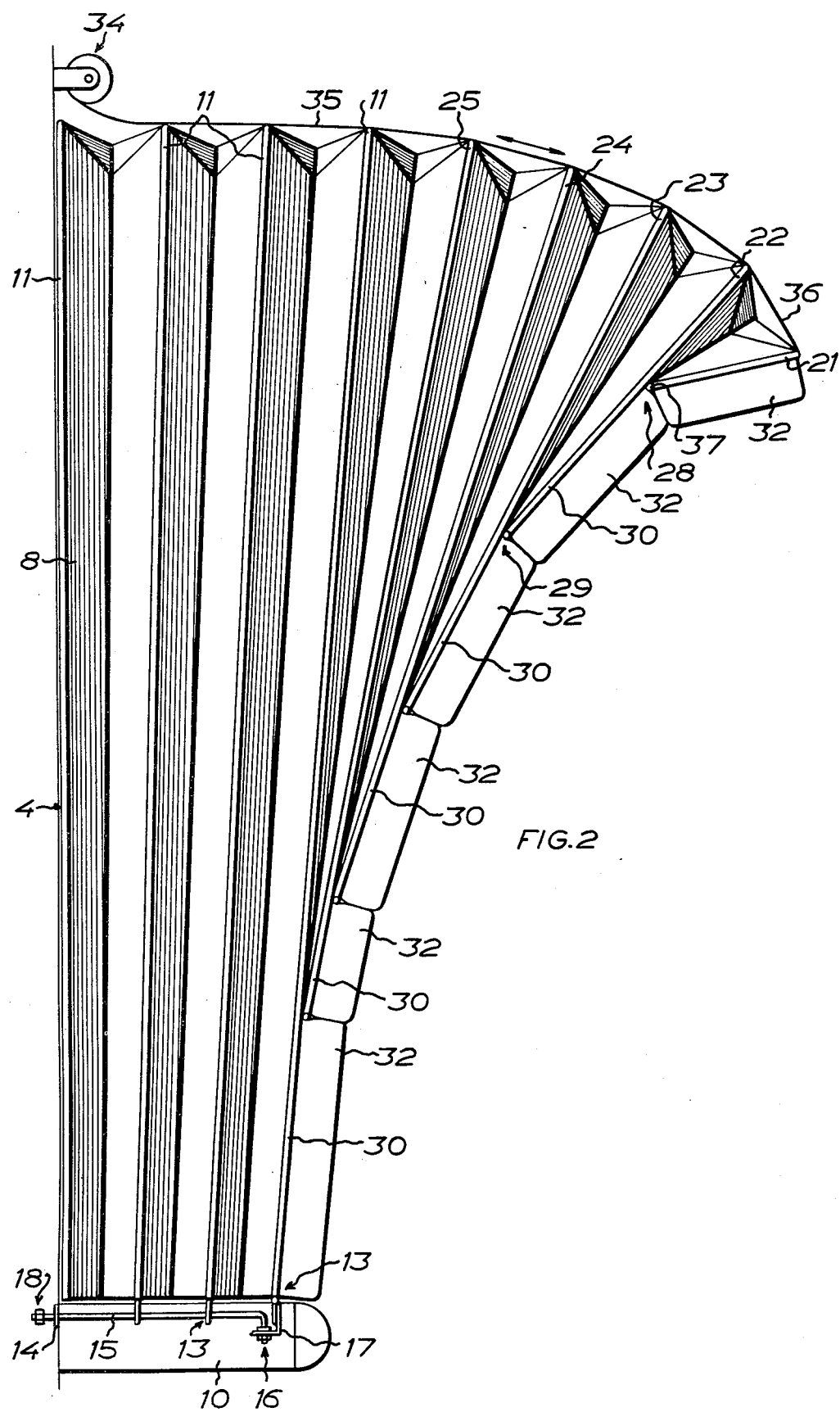
FIG. 2 is a side view of the canopy in extended position.
Figure 3:
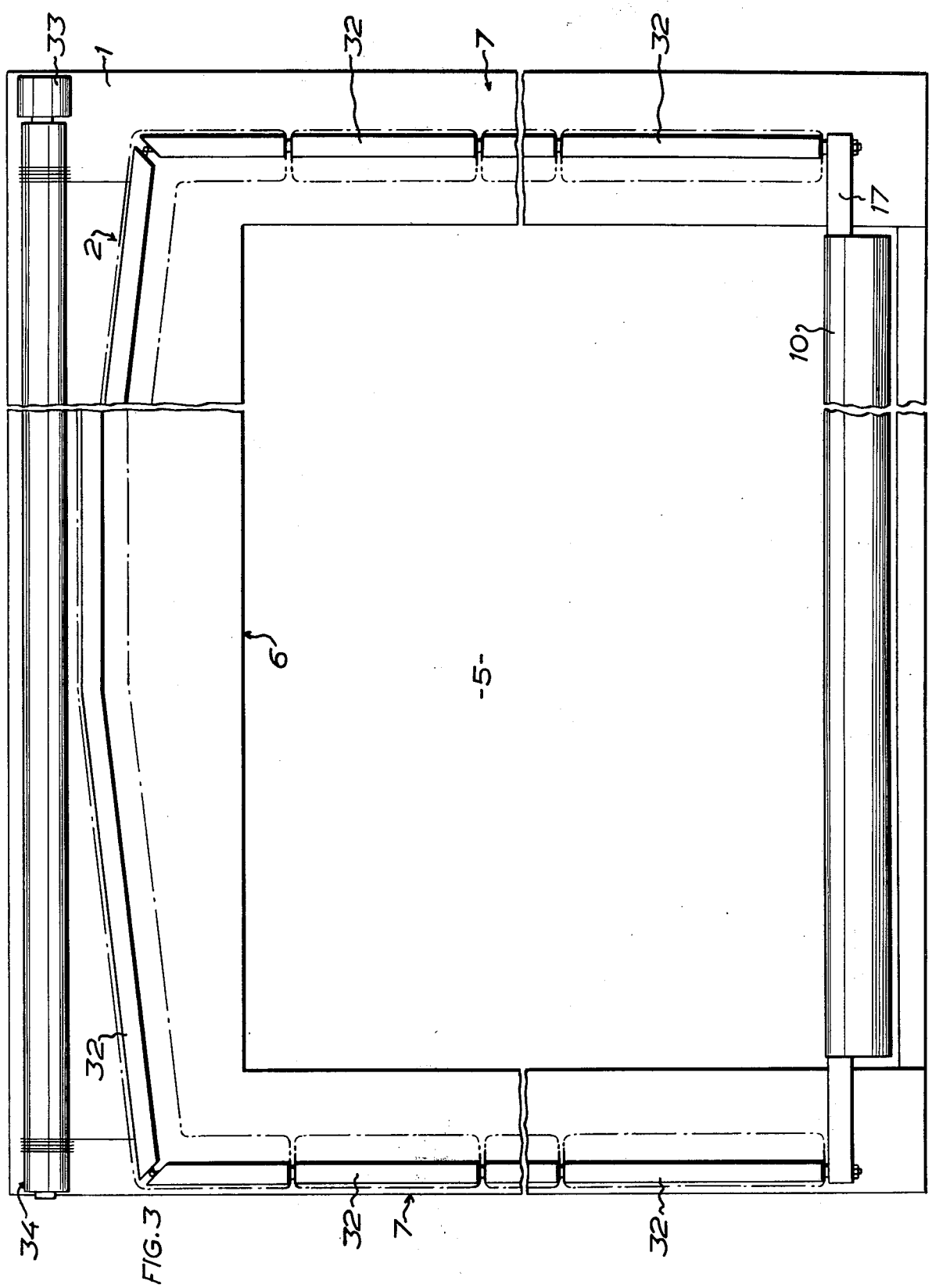
FIG. 3 is a front view of the canopy device.

The canopy device of the invention is shown in more detail in FIGS. 2 and 3 from which its retracting and extending function is clearly apparent. The rear end 4 of the canopy device is secured to the aircraft bridge 1 and encloses the through-opening 5 thereof at the top 6 and at the sides 7. The canopy device 2 consists of a collapsible and extensible bellows cloth 8 of flameproof material. At the bottom 9 (FIG. 1) the bridge is tightened to the aircraft in that a platform 10 in the bridge floor is movable into engagement with the fuselage 3. A series of generally U-shaped guiding and supporting ribs are attached to the outside of the cloth 8 along every outward fold for guiding and bracing the cloth. At their bottom ends 13, the ribs 11 adjacent the bridge are pivotally mounted for vertical movement about two rods 15 provided each in one guide means 14 and movable longitudinally of the aircraft bridge 1, said rods having respectively one end 16 screwed on either end of an angle iron 17 secured to the platform 10, the other ends 18 of said rods having each a stop nut 19 for limiting the extension of the lower portions of the canopy device 2 and the platform 10.

The ribs 21–25 located most remotely from the bridge 1 differ from the other ribs because the length of their side parts decreases in a direction away from the bridge. The outermost rib 21 is connected throughout its length with the front top edge of the cloth 8 and, at the free ends 28 of its side parts, it is connected, for vertical pivotal movement, to the respective side part of the next rib 22, at a distance from the free end 29 thereof, this distance defining the lower portions 30 of the side parts. Said next rib 22 and the immediately following ribs 23–25 are interconnected in the same way.

The protective pads 32 are attached to the top and side parts of the outermost rib and to the bottom parts 30 of the next following ribs 22–25, at the sides of said parts facing the fuselage 3. In the preferred embodiment one pad 32 is applied to each part. The protective pads are covered with a flameproof cloth enclosing a yieldable material, such as foam rubber, for accomodation to the configuration of the fuselage 3. The ribs are made of U-sections between the limbs of which the folds of the cloth are attached. The top part of the outermost rib 21 is a flat band which is yieldable and follows the accomodation of the top pad.

The means for retracting and extending the canopy device consists of a rope hoist 34 driven by a motor 33 and mounted on the bridge 1 above the canopy device 2. The free ends 36 of the ropes 35 are secured to the outermost rib 21 of the canopy.

The extending movement of the canopy is effected by releasing the ropes 35, whereby the outermost rib 21 will pivot in forward-downward direction due to the force of gravity acting upon the mass of the rib which is situated outside the point of oscillation 37 and substantially consists of the protective pads 32 attached to this rib. This rib is followed by the next ribs 22-25 with associated pads which engage the fuselage 3. The rest of the canopy device is extended to the degree required. Retraction of the canopy device is effected by actuating the rope hoist 34 to winch the ropes. Thus, there is no mechanism to keep the canopy device in its extended position but the sole weight of the canopy is sufficient to maintain sufficient tightening.

Figure 4:
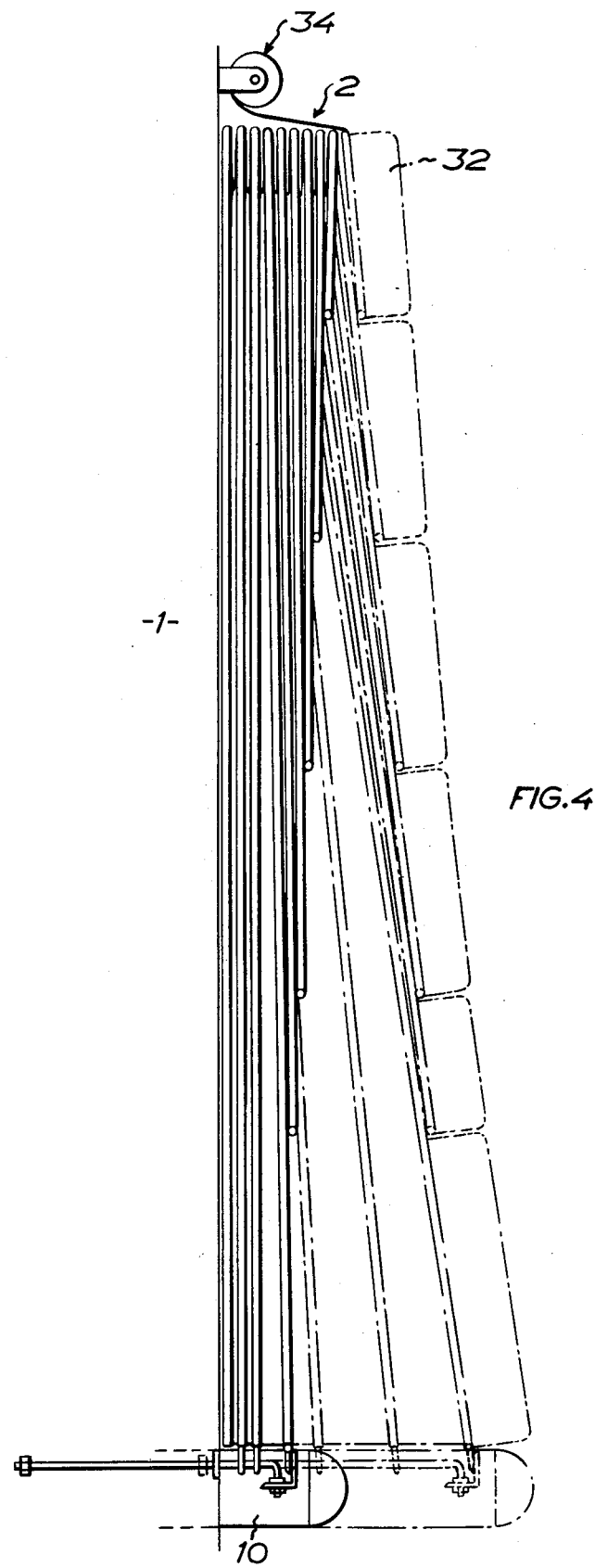
FIG. 4 is a side view of the ribs of the canopy device in retracted position, represented by full lines when a platform is withdrawn in the bottom of the aircraft bridge and by broken lines when this platform is extended so that the protective pads mounted on the canopy ribs are shown in the extended position.

Even if the platform 10 (FIG. 4) is extended before the canopy has been released by means of the rope hoist, the mass will be situated substantially outside a vertical plane through the point of oscillation 37.

The invention is, of course, not restricted to the embodiment described in the foregoing and illustrated in the drawings but it may be modified in various ways within the scope of the claims. Consequently, the means for retracting and extending the canopy device need not necessarily be a rope hoist but may as well be of pneumatic or hydraulic type. The protective pads may have another profile, for instance semi-cylindrical. Also, the number of folds in the cloth and the ribs arranged on it may be varied.

The canopy device of this invention is not only applicable to aircraft bridges but it is of general use in places of loading and/or unloading transport vehicles, such as hovercrafts, trucks or lorries, trains, etc.

What we claim and desire to secure by Letters Patent is:

1. A canopy device intended to be connected between two through-openings which are orientable into alignment with one another and located each in one body the first one of which carries the canopy device and includes the first opening which is generally vertical, and the second body is a craft of varying shape and includes the second opening, said canopy device having a front portion which is movable into engagement with the craft to provide a weatherproof passage between the openings, said canopy device comprising: a collapsible and extensible bellows cloth having its rear edge secured to the two sides and the top part of the first opening; a series of generally U-shaped guide and support ribs which are attached to the cloth for guiding and bracing it and are mounted for pivotal movement at their bottom ends; and a retracting and extending means; the ribs disposed most remotely from said first opening being so arranged that the outermost rib is connected throughout its length with the front top edge of the cloth and, at the free ends of its side parts, is attached, for pivotal movement, to the respective side part of the next rib at a distance from the free end of this rib, said distance defining the lower portions of said side parts, said next rib and at least the immediately following rib being interconnected in the same way; wherein protective pads are attached to the top and side parts of the outermost rib and to the lower parts of the next ribs, at the sides of said parts facing the craft, and wherein, when the canopy device is being extended, the outermost rib with associated pads pivots in forward-downward direction due to gravity, whereupon the next ribs with their pads will follow successively into engagement with the craft.

2. A canopy device as claimed in claim 1, wherein the top part of the outermost rib is a flat band which is yieldable and adapts itself to the configuration of the craft.

3. A canopy device as claimed in claim 1, wherein the top and side parts of the outermost rib as well as the lower parts have each one pad.

4. A canopy device as claimed in claim 1, wherein the retracting and extending means is a rope hoist.

5. A canopy device as claimed in claim 1, for use in aircraft bridges for loading and unloading passengers and/or goods, wherein the lower parts of the canopy device are movable into and out of complete engagement with the fuselage.

6. A canopy device as claimed in claim 1 wherein the center of balance of each of the ribs having protective pads attached thereto is positioned relative to the point of attachment of said rib, whereby said outermost rib will tend to fall under the influence of gravity toward said craft and, when said outermost rib and pad are extended, the ribs carrying protective pads next in order will also tend to fall in succession toward said craft under the influence of gravity.

* * * * *